US007701435B2

(12) United States Patent
Hiramatsu

(10) Patent No.: US 7,701,435 B2
(45) Date of Patent: Apr. 20, 2010

(54) ELECTROPHORETIC DISPLAY, METHOD FOR DRIVING ELECTROPHORETIC DISPLAY, AND STORAGE DISPLAY

(75) Inventor: Kazunori Hiramatsu, Okaya (JP)

(73) Assignee: Seiko Epson Corporation (JP)

( * ) Notice: Subject to any disclaimer, the term of this patent is extended or adjusted under 35 U.S.C. 154(b) by 781 days.

(21) Appl. No.: 10/590,955

(22) PCT Filed: Mar. 25, 2005

(86) PCT No.: PCT/JP2005/006448

§ 371 (c)(1), (2), (4) Date: Aug. 28, 2006

(87) PCT Pub. No.: WO2005/093509

PCT Pub. Date: Oct. 6, 2005

(65) Prior Publication Data

US 2007/0182704 A1 Aug. 9, 2007

(30) Foreign Application Priority Data

Mar. 29, 2004 (JP) ............................ 2004-095608

(51) Int. Cl.
*G09G 3/34* (2006.01)
*G02B 26/00* (2006.01)

(52) U.S. Cl. ...................................... 345/107; 359/296

(58) Field of Classification Search .................. 345/1.1, 345/1.3, 78, 107; 359/296
See application file for complete search history.

(56) References Cited

U.S. PATENT DOCUMENTS 6,803,899 B1 10/2004 Masazumi et al.
2002/0000962 A1 1/2002 Miura et al.
2002/0033792 A1 3/2002 Inoue
2003/0137521 A1 7/2003 Zehner et al.
2004/0085610 A1 5/2004 Katase
2006/0164405 A1* 7/2006 Zhou .......................... 345/204

FOREIGN PATENT DOCUMENTS

CN 1345026 A 4/2002
EP 1184714 A2 3/2002
JP 1-99031 A 4/1989

(Continued)

OTHER PUBLICATIONS

International Search Report for PCT/JP2005/006448; ISA/JP, Mailed: Jul. 19, 2005.

(Continued)

*Primary Examiner*—Bipin Shalwala
*Assistant Examiner*—Ilana Spar
(74) *Attorney, Agent, or Firm*—Harness, Dickey & Pierce, P.L.C.

(57) ABSTRACT

An electrophoretic display according to the present invention includes a first reset step for applying a first voltage to electrophoretic devices such that no image is displayed and no afterimages are present in the electrophoretic devices between a first step for displaying a first image on the electrophoretic devices and a second step for displaying a second image on the electrophoretic devices and a second reset step for applying a second voltage higher than the first voltage such that no image is displayed and no afterimage is present in the electrophoretic devices at a frequency less than that at which the first reset step is performed.

5 Claims, 6 Drawing Sheets

FOREIGN PATENT DOCUMENTS

| | | | |
|---|---|---|---|
| JP | 11-44871 | A | 2/1999 |
| JP | 2001-51255 | A | 2/2001 |
| JP | 2001-281634 | A | 10/2001 |
| JP | 2002-149115 | A | 5/2002 |
| TW | 538263 | B | 6/2003 |
| WO | WO 03/100757 | A1 | 12/2003 |
| WO | WO 2005/019912 | | 3/2005 |

OTHER PUBLICATIONS

Written Opinion of the International Searching Authority for PCT/JP2005/006448, ISA/JP, Mailed Jul. 19, 2005.

* cited by examiner (A) DISPLAY BLACK (B) DISPLAY WHITE

FIG. 5

| | VOLTAGE (V) OF COMMON ELECTRODE CE | VOLTAGE (V) OF PIXEL ELECTRODES PE11 TO PEmn |
|---|---|---|
| DISPLAY BLACK | 0 | $V_L$ |

FIG. 6

| TYPE | VOLTAGE (V) OF COMMON ELECTRODE CE | VOLTAGE (V) OF PIXEL ELECTRODES PE11 TO PEmn |
|---|---|---|
| NORMAL BLACK RESET | $-V_L$ | 0 |
| NORMAL WHITE RESET | $V_L$ | 0 |
| FORCED BLACK RESET | $-V_H$ | 0 |
| FORCED WHITE RESET | $V_H$ | 0 |

ELECTROPHORETIC DISPLAY, METHOD FOR DRIVING ELECTROPHORETIC DISPLAY, AND STORAGE DISPLAY

TECHNICAL FIELD

The present invention relates to storage displays displaying images using memory devices, such as digital books, and more particularly, to an electrophoretic display employing electrophoretic devices as the memory devices and a method for driving the electrophoretic display.

BACKGROUND ART

Known electrophoretic displays include a step of resetting a display such that no image is displayed on the display and no afterimages caused by image data already written on electrophoretic devices are present when writing other image data subsequent to the previously written image data, which is described in Japanese Unexamined Patent Application Publication No. 2002-149115.

Unfortunately, with the reset step in the known electrophoretic displays, a relatively high voltage is applied to the electrophoretic devices in order that the afterimages caused by the image data already written on the electrophoretic devices do not occur. Accordingly, the known electrophoretic displays suffer from a problem in that energy consumption is large.

DISCLOSURE OF INVENTION

To solve the aforementioned problems, a method for driving an electrophoretic display according to one aspect of the present invention includes: a first reset step of setting a plurality of electrophoretic devices to a second non-display state in which no image is displayed and afterimages caused by writing first image data in a first writing step may be present by applying a first voltage to the plurality of electrophoretic devices between the first writing step for writing the first image data representing a first image in the plurality of electrophoretic devices so as to display the first image on the plurality of electrophoretic devices and a second writing step for writing second image data representing a second image in the plurality of electrophoretic devices so as to display the second image on the plurality of electrophoretic devices, the first voltage being lower than a non-display-without-afterimage voltage for setting the plurality of electrophoretic devices to a first non-display state in which no image is displayed and the afterimages are not present; and a second reset step for applying a second voltage serving as the non-display-without-afterimage voltage to the plurality of electrophoretic devices so as to set the plurality of electrophoretic devices to the first non-display state at a frequency less than that at which the first reset step is performed.

According to the aspect of the present invention, the first voltage lower than the non-display-without-afterimage voltage, which is used in the known reset process, is applied in the first reset corresponding to the known reset process, whereas the second voltage equal to the non-display-without-afterimage voltage is applied in the second reset step at a frequency less than that at which the first reset step is performed. Consequently, power consumption is suppressed as compared to the known electrophoretic display, while no afterimages are present on the electrophoretic elements similarly to the known electrophoretic display.

The method for driving an electrophoretic display according to the aspect of the present invention may further include a determination step of determining whether or not erasing the afterimages is necessary, wherein when it is determined that erasing the afterimages is necessary in the determination step, the second reset step is performed.

In the method for driving an electrophoretic display according to the aspect of the present invention, the determination step may be performed by perceiving the afterimages or detecting the presence of the afterimages.

An electrophoretic display according to another aspect of the present invention includes: a plurality of electrophoretic devices; and a controlling unit for performing a first reset for applying a first voltage to the plurality of electrophoretic devices between the first writing for writing first image data representing a first image in the plurality of electrophoretic devices so as to display the first image on the plurality of electrophoretic devices and a second writing for writing second image data representing a second image in the plurality of electrophoretic devices so as to display the second image on the plurality of electrophoretic devices, the first voltage being lower than a non-display-without-afterimage voltage for setting the plurality of electrophoretic devices to a first non-display state in which no image is displayed and afterimages caused by the first writing are not present and for performing a second reset for applying a second voltage serving as the non-display-without-afterimage voltage to the plurality of electrophoretic devices so as to set the plurality of electrophoretic devices to the first non-display state at a frequency less than that at which the first reset is performed.

The electrophoretic display according to the aspect of the present invention may further include an input unit for inputting a command indicating that erasing the afterimages is necessary, wherein when the command indicating that erasing the afterimages is necessary is input, the control unit performs the second reset.

A storage display according to another aspect of present invention includes: a plurality of memory devices; and a controlling unit for performing a first reset for applying a first voltage to the plurality of memory devices between the first writing for writing first image data representing a first image in the plurality of memory devices so as to display the first image on the plurality of memory devices and a second writing for writing second image data representing a second image in the plurality of memory devices so as to display the second image on the plurality of memory devices, the first voltage being lower than a non-display-without-afterimage voltage for setting the plurality of memory devices to a first non-display state in which no image is displayed and afterimages caused by the first writing are not present and for performing a second reset for applying a second voltage serving as the non-display-without-afterimage voltage to the plurality of memory devices so as to set the plurality of memory devices to the first non-display state at a frequency less than that at which the first reset is performed.

BRIEF DESCRIPTION OF THE DRAWINGS

The aforementioned and further objects, features, and advantages of the present invention will become apparent from the following description of preferred embodiments of the present invention with reference to the attached drawings.

FIG. 5 is a drawing showing the voltage applied when displaying black.

FIG. 6 is a drawing showing the voltage applied when performing normal reset and forced reset.

BEST MODE FOR CARRYING OUT THE INVENTION

Figure 1:
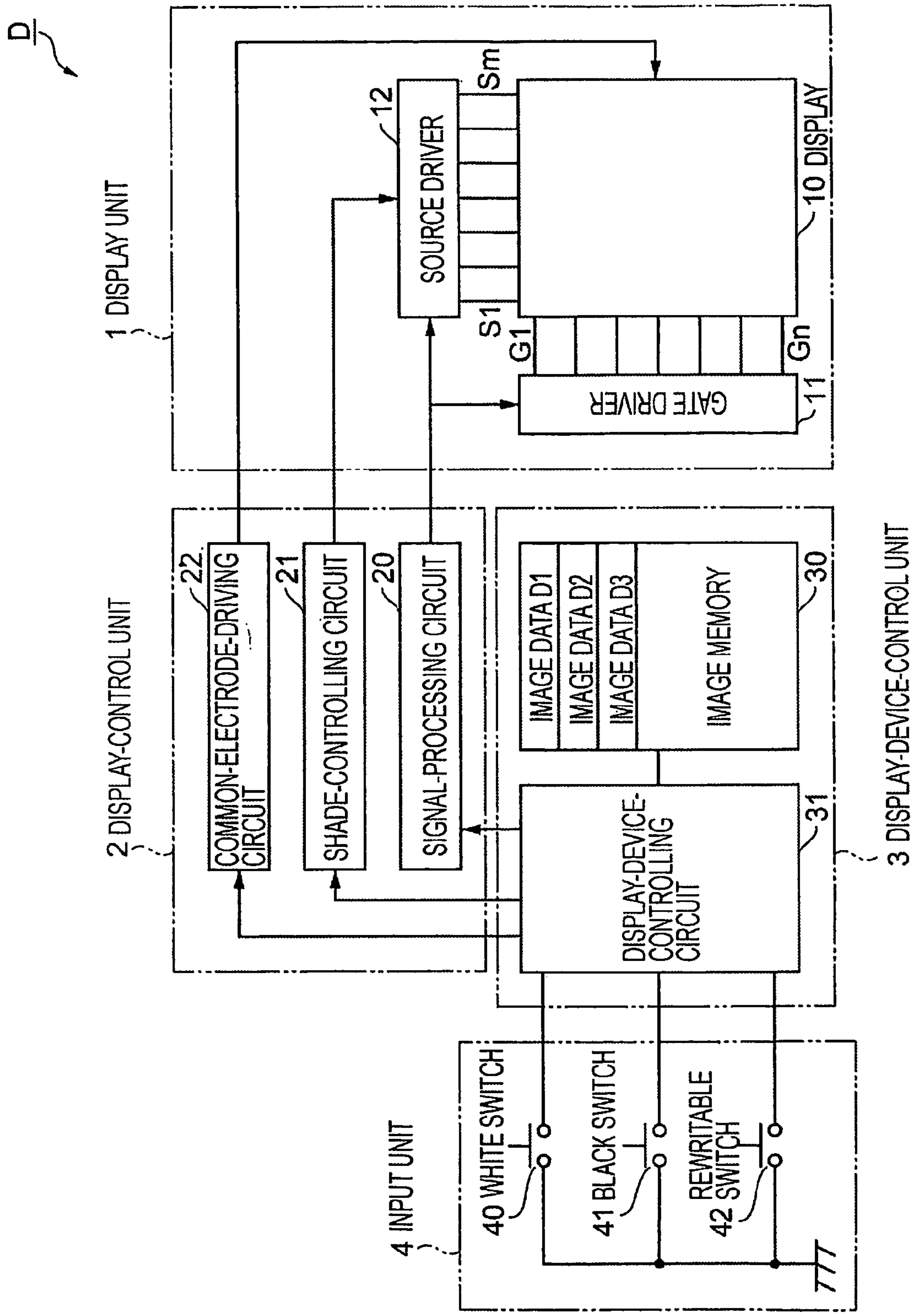
FIG. 1 is a block diagram of the structure of an electrophoretic display according to an embodiment.

Embodiments of an electrophoretic display and a method for driving the electrophoretic display according to the present invention will now be described by referring to the drawings.

Embodiments

Figure 4:
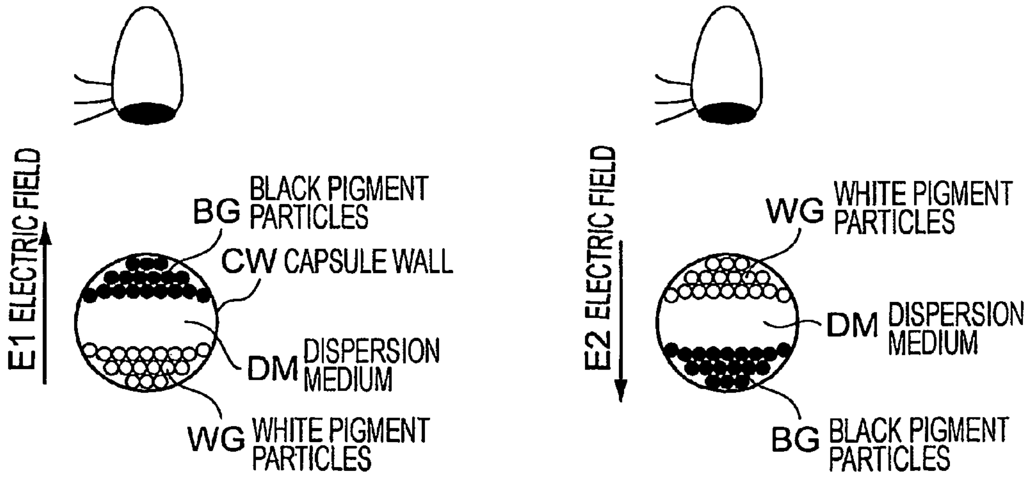
FIG. 4 illustrates cross sectional views showing the structures and states of the electrophoretic devices according to the embodiment.

FIG. 1 shows the structure of the electrophoretic display of the embodiment according to the present invention. An electrophoretic display D, which is a storage display of the embodiment, includes a display unit 1, a display-control unit 2, a display-device-control unit 3, and an input unit 4, as shown in FIG. 4. The electrophoretic display D writes image data onto a plurality of electrophoretic devices with storing ability to display an image defined by "white" or "black" in accordance with the image data on the plurality of electrophoretic devices. The electrophoretic display D also performs reset for erasing afterimages on the plurality of electrophoretic devices, synchronously with writing of the image data (referred to as normal reset hereinbelow), the afterimages being caused by writing the image data, and reset for erasing the aforementioned afterimages less frequently, asynchronously with writing of the image data (referred to as forced reset hereinbelow). The normal reset corresponds to a first reset, while the forced reset corresponds to a second reset.

As shown in FIG. 1, the display unit 1 includes a display 10 having the plurality of electrophoretic devices, a gate driver 11 for controlling ON/OFF switching of the display 10 under the control of the display-control unit 2, and a source driver 12 for writing the image data onto the display 10 under the control of the display-control unit 2.

Figure 2:
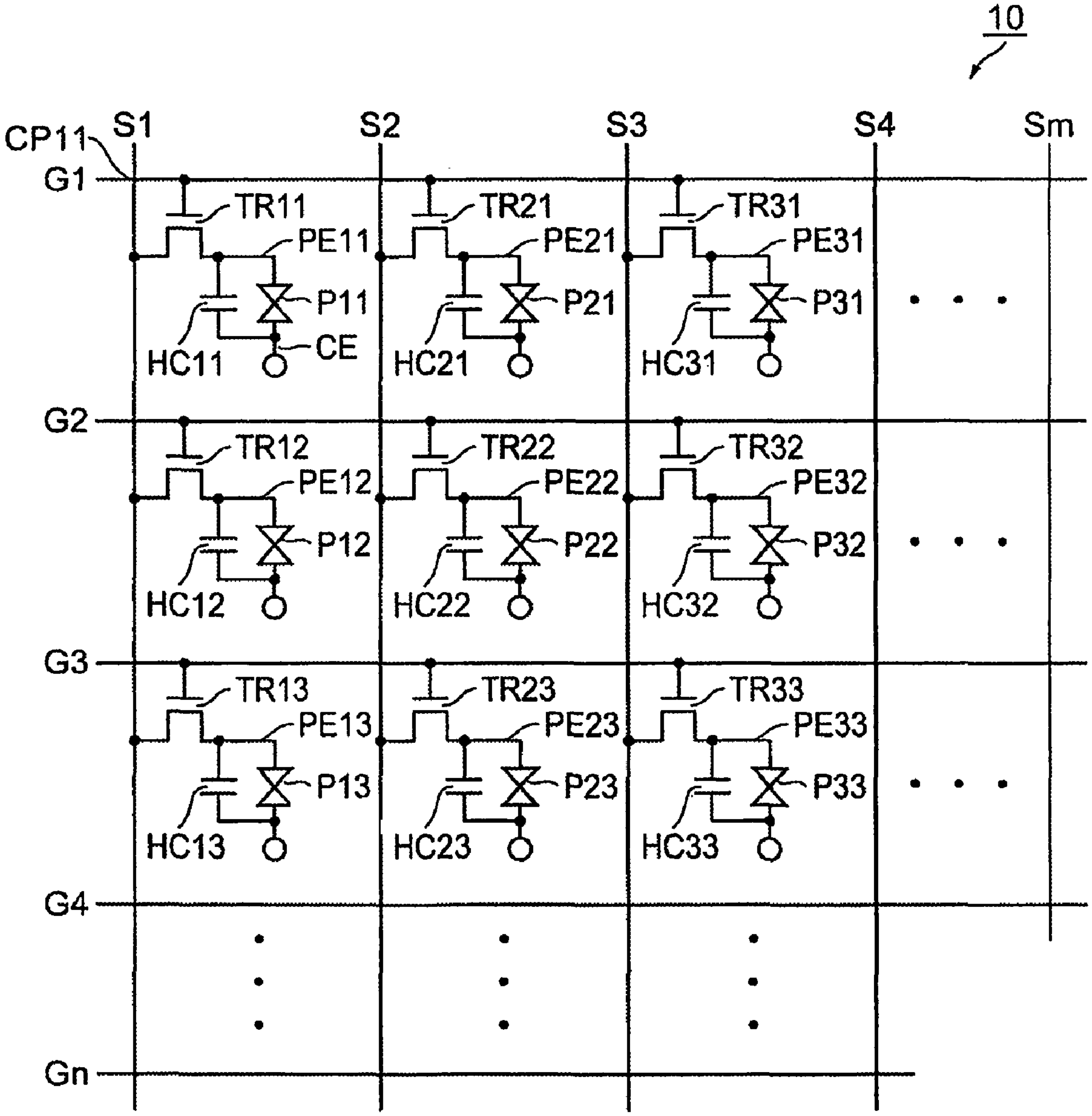
FIG. 2 is a schematic circuit diagram showing the structure of the display of the embodiment.

FIG. 2 is a schematic circuit diagram showing the structure of the display. The display 10 includes electrophoretic devices P11 to Pmn, storage capacitors HC11 to HCmn, and thin film transistors TR11 to TRmn at the intersections of a plurality of source lines (source electrodes) S1 to Sm (m is a given integer greater than or equal to two) and a plurality of gate lines (gate electrodes) G1 to Gn (n is a given integer greater than or equal to two) aligned in a matrix, as shown in FIG. 2. More specifically, the electrophoretic device P11 and the storage capacitor HC11 are connected in series at an intersection CP11, for example. A pixel electrode PE11 for the electrophoretic device P11 is connected to a drain electrode for the thin film transistor TR11. A common electrode CE shared with the electrophoretic devices P11 to Pmn is connected to a ground potential. The gate electrode for the thin film transistor TR11 is connected to the gate line G1, whereas the source electrode for the thin film transistor TR11 is connected to the source line S1.

The display 10 is driven by, e.g., a known point-sequential driving method and a line-sequential driving method. In the electrophoretic device P11, for example, the thin film transistor TR11 is turned on when the gate driver 11, shown in FIG. 1, allows the gate line G1 to apply a gate signal, and image data is stored in the storage capacitor HC11 when the source driver 12, shown in FIG. 1, allows the source line S1 to apply the image data signal. In accordance with the magnitude of the voltage for image data defined by the storage capacitor HC11, the electrophoretic device P11 displays "white" or "black" depending on the image data.

Figure 3:
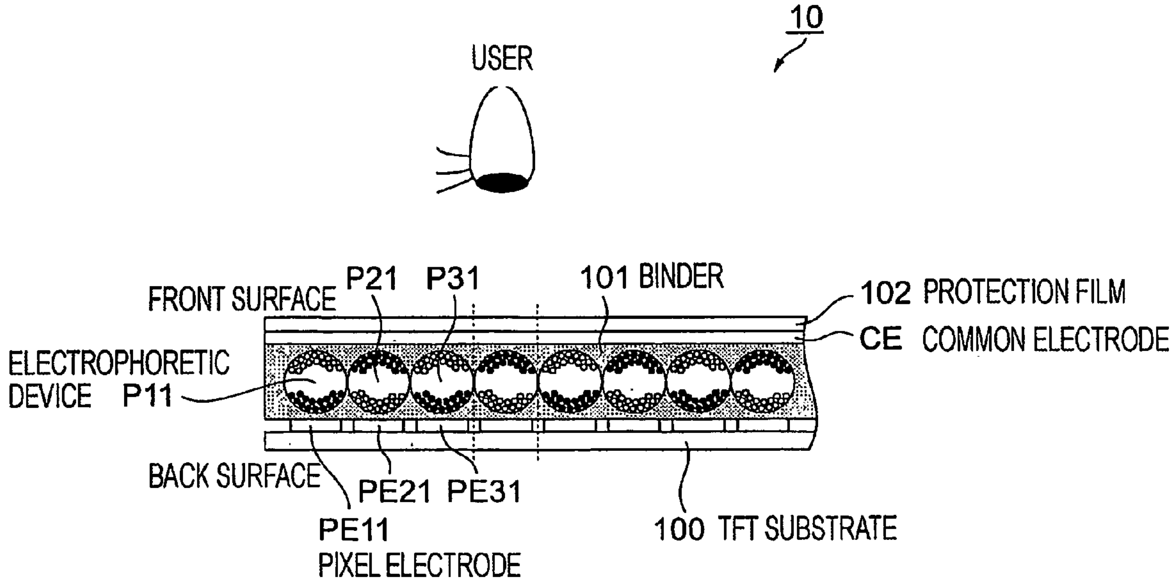
FIG. 3 is a cross-sectional view showing the, structure of the display of the embodiment.

FIG. 3 shows the structure of the display. The display 10 has a known structure, as shown in FIG. 3. Pixel electrodes PE11, PE21, PE31, and . . . PEm1 corresponding to a gate line G are aligned on a thin film transistor (TFT) substrate 100 disposed on the back surface of the display 10 (the side which a user cannot see), for example. The common electrode CE covered by a protection film 102 is disposed on the top surface of the display 10 that opposes the pixel electrodes PE11, PE21, PE31, and . . . PEm1 and pixel electrodes PE12 to PEmn (the side which a user cannot see). The electrophoretic devices P11, P21, P31, . . . and Pm1 are fixed by a binder 101 serving as a filler between the pixel electrodes PE11, PE21, PE31, and . . . PEm1 and the common-electrode CE.

FIG. 4 illustrates cross-sectional views showing the structures and states of the electrophoretic devices. More specifically, FIG. 4(A) shows electrophoretic devices displaying "black", whereas FIG. 4(B) shows electrophoretic devices displaying "white". The electrophoretic devices P11 to Pmn are microcapsules, as shown in FIGS. 4(A) and (B). More specifically, the electrophoretic devices P11 to Pmn include positively-charged (+) black pigment particles BG and negatively-charged (−) white pigment particles WG serving as core materials in a capsule wall CW composed of polymer film. The positions of the black pigment particles BG and the white pigment particles WG within the capsule wall CW, defined by an electric field applied from outside, are stably maintained by a dispersion medium DM.

In a case where the electrophoretic devices P11 to Pmn display "black", when an electric field E1 is applied from the back surface to the front surface, as shown in FIG. 4(A), the positively-charged (+) black pigment particles BG are moved towards the front surface within the capsule wall CW, while the negatively-charged (−) white pigment particles WG are moved towards the back surface within the capsule wall CW. Accordingly, the electrophoretic devices P11 to Pmn display "black" on the front surface of the display 10, whereby the user perceives "black".

On the other hand, in a case where the electrophoretic devices P11 to Pmn display "white", when an electric field E2 is applied from the front surface to the back surface, as shown in FIG. 4(B), the white pigment particles WG are moved towards the front surface, while the black pigment particles BG are moved towards the back surface. Accordingly, the electrophoretic devices P11 to Pmn display "white", whereby the user perceives "white" on the front surface of the display 10.

Referring back to FIG. 1, the display-control unit 2 includes a signal-processing circuit 20, a shade-controlling circuit 21, and a common-electrode-driving circuit 22 in order to operate the-display unit 1.

The signal-processing circuit 20 processes a gate signal and image data necessary for the gate driver 11 and the source driver 12 in the display unit 1 to display an image on the display 10 in accordance with various signals, such as an image signal, a clock signal, or a periodic signal received from the display-device-control unit 3. The signal-processing circuit 20 outputs the gate signal to the gate driver 11 and outputs the processed image data to the source driver 12.

The shade-controlling circuit 21 generates a shade signal for modifying or changing the grayscale level of the image data using the image data received from the display-control unit 3 and outputs the shade signal to the source driver 12.

The common-electrode-driving circuit 22 controls the amplitude of voltage to be applied to the common electrode CE, shown in FIG. 2. More specifically, the common-electrode-driving circuit 22, for example, fixes voltage to be applied to the common electrode CE to a ground potential or applies a given voltage to the common electrode CE depending on the type of driving of the electrophoretic devices P11 to Pmn.

The display-device-control unit 3 includes an image memory 30 and a display-device-controlling circuit 31 in order to supply signals and data, such as image data, required for the display-control unit 2 to control the operation of the display unit 1 to the display-control unit 2. The image memory 30 stores image data to be displayed on the display 10 in the display unit 1. The display-device-controlling circuit 31 has a function to control the overall operation of the electrophoretic display D. More specifically, the display-device-controlling circuit 31 reads out image data stored in the image memory 30 and outputs the read-out image data to the signal-processing circuit 20 and the shade-controlling circuit 21 in the display-control unit 2. Furthermore, the display-device-controlling circuit 31 outputs a control signal in accordance with the driving method of the electrophoretic devices P11 to Pmn to the common-electrode-driving circuit 22 in the display-control unit 2. The common-electrode-driving circuit 22 defines the voltage to be applied to the common electrode CE in response to the control signal.

The display-device-controlling circuit 31 allows the display-control unit 2 to perform the normal reset and the forced reset of the electrophoretic devices P11 to Pmn in response to a reset signal for erasing afterimages received from the input unit 4, as will be described below. As necessary, the display-device-controlling circuit 31 allows the display-control unit 2 to write image data to the electrophoretic devices P11 to Pmn, besides the normal reset and the forced reset.

The input unit 4 determines the types of forced reset to be performed on the electrophoretic devices P11 to Pmn in accordance with afterimages perceived by the user or afterimages detected by an afterimage-detecting circuit (not shown). The input unit 4 includes a white switch 40, a black switch 41, and a rewritable switch 42.

The white switch 40 turns all the electrophoretic devices P11 to Pmn "white"; that is, the white switch 40 is used to perform white reset. The black switch 41 turns all the electrophoretic devices P11 to Pmn "black"; that is, the black switch 41 is used to perform black reset. The rewritable switch 42 is used to input a command to write image data after the forced reset.

FIG. 5 shows the voltage applied to the electrophoretic devices when displaying "black". FIG. 6 shows the voltage applied to the electrophoretic devices when performing the normal reset and the forced reset. When a given electrophoretic device out of the electrophoretic devices P11 to Pmn, for example, the electrophoretic device P11, is to display "black", as shown in FIG. 5, zero voltage (ground voltage) is applied to the common electrode CE, shown in FIG. 2, and voltage VL is applied to the pixel electrode PE11, shown in FIG. 2; that is, the electric field E1, shown in FIG. 4(A), is applied to the electrophoretic device P11.

On the other hand, when all the electrophoretic devices P11 to Pmn are reset to "black", that is, when normal black reset is performed, voltage −VL is applied to the common electrode CE and zero voltage is applied to the pixel electrodes PE11 to PEmn; that is, the electric field E1, shown in FIG. 4(A), is applied to all the electrophoretic devices P11 to Pmn to reset the electrophoretic devices P11 to Pmn to "black".

By contrast, when all the electrophoretic devices P11 to Pmn are reset to "white", that is, when normal white reset is performed, voltage VL is applied to the common electrode CE and zero voltage is applied to the pixel electrodes PE11 to PEmn; that is, the electric field E2, shown in FIG. 4(B), is applied to all the electrophoretic devices P11 to Pmn to reset the electrophoretic devices P11 to Pmn to "white".

The absolute value of the voltage VL is smaller than that of voltage VH, which is a non-display-without-afterimage voltage necessary for displaying no image on the electrophoretic devices P11 to Pmn without any afterimages. Therefore, even though the aforementioned normal black reset or normal white reset is performed, afterimages caused by writing the image data may occur.

When all the electrophoretic devices P11 to Pmn are reset to "black", that is, when forced black reset is performed, voltage −VH with the same absolute value as that of non-display-without-afterimage voltage is applied to the common electrode CE and zero voltage is applied to the pixel electrodes PE11 to PEmn; that is, an electric field larger than the electric field E1 is applied to all the electrophoretic devices P11 to Pmn in the same direction as that of the electric field E1, shown in FIG. 4(A). Accordingly, the electrophoretic devices P11 to Pmn are forcefully reset to absolute black where no image is displayed and no afterimage is present.

On the other hand, when all the electrophoretic devices P11 to Pmn are reset to "white", that is, when forced white reset is performed, voltage VH with the same absolute value as that of non-display-without-afterimage voltage is applied to the common electrode CE and zero voltage is applied to the pixel electrodes PE11 to PEmn; that is, an electric field larger than the electric field E2 is applied to all the electrophoretic devices P11 to Pmn in the same direction as that of the electric field E2, shown in FIG. 4(B). Accordingly, the electrophoretic devices P11 to Pmn are reset to absolute white where no image is displayed and no afterimage is present.

In the normal black reset and forced black reset, unlike when writing image data to be displayed in "black", shown in FIG. 5, zero voltage is applied to the pixel electrode PE11, not voltage VL or voltage VH. This is because it is not easy to maintain the pixel electrode PE11 to have a voltage other than zero voltage.

Figure 7:
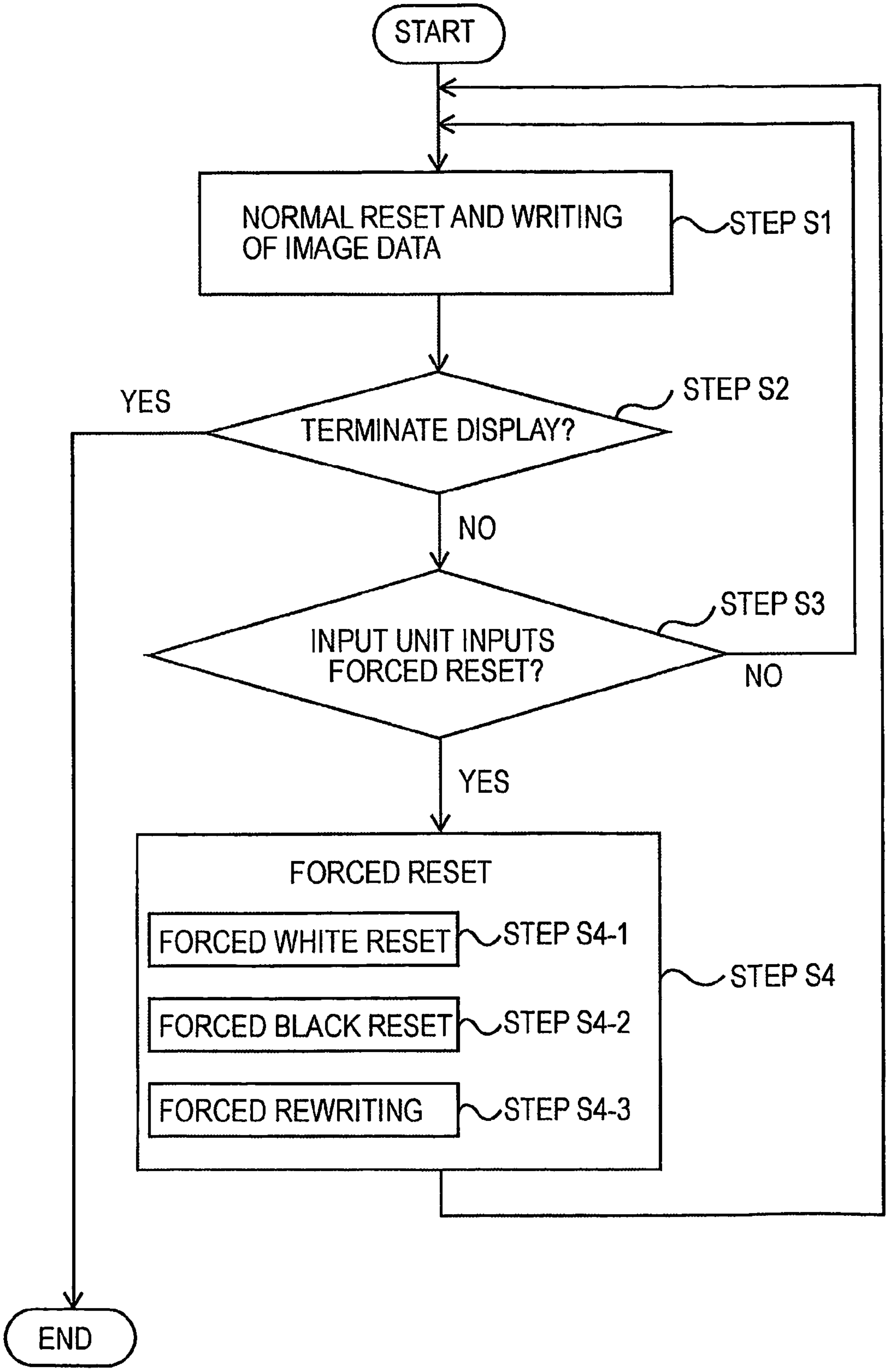
FIG. 7 is a flow chart of the operation of the electrophoretic display of the embodiment.
Figure 8:
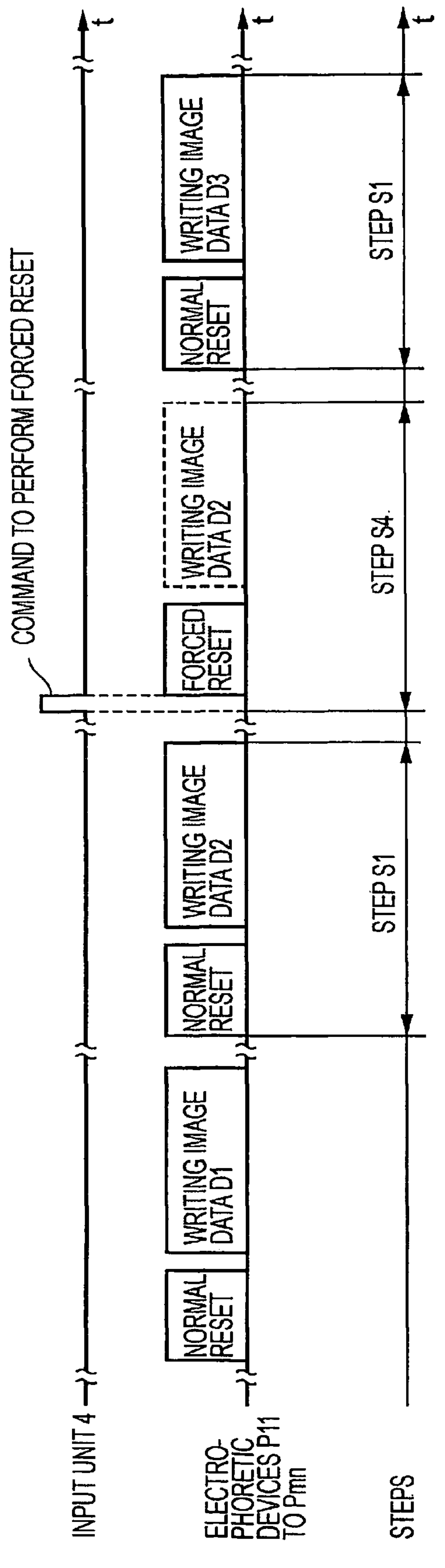
FIG. 8 is a timing chart of the operation of the electrophoretic display of the embodiment.

FIGS. 7 and 8 are a flow chart and a timing chart of the operation of the electrophoretic display of the embodiment, respectively. Hereinbelow, the operation of the electrophoretic display of the embodiment will be described by referring to the flow chart in FIG. 7 and the timing chart in FIG. 8. To facilitate description and comprehension, in the following description, it is assumed that the electrophoretic devices P11 to Pmn display an image in "black" on a "white" background, and image data D1 shown in FIG. 8, which is written in the electrophoretic devices P11 to Pmn, is displayed.

Step S1: When the signal-processing circuit 20 in the display-control unit 2 receives a command signal (not shown) to display image data D2 subsequent to the image data D1, shown in FIG. 8, from the display-device-controlling circuit 31 in the display-device-control-unit 3, the voltage VL is applied to the common electrode CE to perform the normal white reset on the electrophoretic devices P11 to Pmn, and zero voltage is applied to the pixel electrodes PE11 to PEmn, as shown in FIG. 6. Subsequent to the normal white reset, the signal-processing circuit 20 reads out the image data D2 from the image memory 30 in the display-device-control unit 3.

After a gate signal is generated to display the image data D2, the image data D2 and the gate signal are output to the source driver 12 and the gate driver 11.

Step 2: The display-device-controlling circuit 31 in the display-device-control unit 3 confirms whether or not an external switch (not shown) for terminating the operation of image display by the electrophoretic display D inputs a signal for the termination of the display operation. When the signal is input, the display-device-controlling circuit 31 terminates the display of the image data D2 by the electrophoretic devices P11 to Pmn. When the signal is not input, the display-device-controlling circuit 31 continues displaying the image data D2.

Step S3: The display-device-controlling circuit 31 in the display-device-control unit 3 confirms whether or not the forced reset is input from the input unit 4 by way of the white switch 40, the black switch 41, or the rewritable switch 42, that is, whether or not a command to perform the forced reset is input. When the display-device-controlling circuit 31 confirms that the forced reset is input, a process for the forced reset is performed.

Step S4: The signal-processing circuit 20 performs the following forced reset in accordance with the type of forced reset input from the input unit 4.

Step S4-1: When a command to perform "forced white reset" is input through the white switch 40, the display-device-controlling circuit 31 notifies the signal-processing circuit 20 to perform "forced white reset". When the signal-processing circuit 20 receives this notification, the signal-processing circuit 20 outputs voltage VH, which is supposed to be applied to the common electrode CE shown in FIG. 6, and zero voltage, which is supposed to be applied to the pixel electrodes PE11 to PEmn shown in FIG. 6, to the gate driver 11 and the source driver 12 at the timing shown by the solid lines in Step S4 in FIG. 8. After the voltage is retained in the gate driver 11 and the source driver 12 for a certain period of time, zero voltage is applied to the common electrode CE.

Step S4-2: When a command to perform "forced black reset" is input through the black switch 41, the display-device-controlling circuit 31 notifies the signal-processing circuit 20 to perform "forced black reset". When the signal-processing circuit 20 receives this notification, the signal-processing circuit 20 outputs voltage –VH, which is supposed to be applied to the common electrode CE, as shown in FIG. 6, and zero voltage, which is supposed to be applied to the pixel electrodes PE11 to PEmn, as shown in FIG. 6, to the gate driver 11 and the source driver 12 at the timing shown by the solid lines in Step S4 in FIG. 8. After the voltage is retained in the gate driver 11 and the source driver 12 for a certain period of time, zero voltage is applied to the common electrode CE, similarly to Step S4-1.

Step S4-3: When a command to perform "forced reset and writing of image data" is input through the rewritable switch 42, the display-device-controlling circuit 31 notifies the signal-processing circuit 20 to perform "forced reset and writing of image data". Similarly to the forced white reset, when the signal-processing circuit 20 receives this notification, the signal-processing circuit 20 outputs voltage VH, which is supposed to be applied to the common electrode CE shown in FIG. 6, and zero voltage, which is supposed to be applied to the pixel electrodes PE11 to PEmn shown in FIG. 6, to the gate driver 11 and the source driver 12 at the timing shown by the solid lines in Step S4 in FIG. 8. After the voltage is retained in the gate driver 11 and the source driver 12 for a certain period of time, the forced white reset is performed on the electrophoretic devices P11 to Pmn by applying zero voltage to the common electrode CE.

Subsequent to the forced white reset, the signal-processing circuit 20 controls the gate driver 11 and the source driver 12 so as to apply zero voltage to the common electrode CE, as shown in FIG. 5, and to apply voltage VL to a pixel electrode ij (i is a given integer in the range of 1 to m, and j is a given integer in the range of 1 to n) out of the pixel electrodes PE11 to PEmn to display black defined by the image data D2 at the timing shown by broken lines in Step S4 in FIG. 8. Accordingly, the image data D2 that have been written in the electrophoretic devices P11 to Pmn in the preceding Step S1 are redisplayed on the electrophoretic devices P11 to Pmn.

Step S1: When the aforementioned forced reset is completed, the signal-processing circuit 20 returns back to Step S1 to perform a process for displaying image data D3 subsequent to the image data D2.

As described above, in the electrophoretic display D according to the embodiment, when a command to perform the forced white reset, forced black reset, or forced rewriting by way of the white switch 40, the black switch 41, or the rewritable switch 42 in the input unit 4 is input, under the control of the display-device-controlling circuit 31 in the display-device-control unit 3, the signal-processing circuit 20 in the display-control unit 2 performs the normal reset on the electrophoretic devices P11 to Pmn by using voltage VL lower than that used in the known normal reset, that is, using a voltage VL less than the voltage used in the known normal reset for erasing afterimages. On the other hand, the forced reset is performed using voltage VH higher than that used in the known normal reset, that is, using a voltage VH higher than the voltage used in the known normal reset for erasing afterimages. Accordingly, power consumption in the electrophoretic display of the embodiment is reduced as compared to the known electrophoretic display, while afterimages on the electrophoretic devices P11 to Pmn are eliminated on the same level with the known electrophoretic display.

In the forced rewriting in Step S4-3, "writing" is performed after "forced white reset" and "forced black reset" or "writing" is performed after "forced black reset" and "forced white reset" in place of "writing" subsequent to "forced white reset" or "writing" subsequent to "forced black reset". In other words, by performing both "forced black reset" and "forced white reset" prior to "writing", afterimages can be eliminated more effectively than the electrophoretic display D of the embodiment.

The same effects can be achieved by writing the image data D3 subsequent to the image data D2, instead of writing the image data D2 in Step S4.

The invention claimed is:

1. A method for driving an electrophoretic display, comprising:

a first writing step of displaying a first image by applying a first voltage to a plurality of electrophoretic devices;

after application of said first voltage to said plurality of electrophoretic devices, a first reset step of erasing said first image by applying a first reset voltage to said plurality of electrophoretic devices, said first reset voltage being of a magnitude that a first afterimage of said first image remains;

after said first reset step, a second writing step of displaying a second image by applying a second voltage to said plurality of electrophoretic devices;

after said second writing step, a second reset step of erasing said second image by applying a second reset voltage to said plurality of electrophoretic devices, said second reset voltage being equal to said first reset voltage such that a second afterimage of said second image remains;

after said second reset step, a third image writing step of displaying a third image by applying a third voltage to said plurality of electrophoretic devices; and after said third image writing step, a third reset step of completely erasing said third image by applying a third reset voltage to said plurality of electrophoretic devices, said third reset voltage being of a greater magnitude than said first and second reset voltages such that no afterimages of said first, second, and third images remain.

2. The method for driving an electrophoretic display according to claim 1, further comprising a determination step of determining whether or not erasing the afterimages is necessary, wherein when it is determined that erasing the afterimages is necessary in the determination step, the third reset step is performed.

3. The method for driving an electrophoretic display according to claim 2, wherein the determination step is performed by perceiving the afterimages or detecting the presence of the afterimages.

4. An electrophoretic apparatus, comprising:

a plurality of electrophoretic devices; and a controlling unit for performing:

a first writing step of displaying a first image by applying a first voltage to said plurality of electrophoretic devices;

after application of said first voltage to said plurality of electrophoretic devices, a first reset step of erasing said first image by applying a first reset voltage to said plurality of electrophoretic devices, said first reset voltage being of a magnitude that a first afterimage of said first image remains;

after said first reset step, a second writing step of displaying a second image by applying a second voltage to said plurality of electrophoretic devices;

after said second writing step, a second reset step of erasing said second image by applying a second reset voltage to said plurality of electrophoretic devices, said second reset voltage being equal to said first reset voltage such that a second afterimage of said second image remains;

after said second reset step, a third image writing step of displaying a third image by applying a third voltage to said plurality of electrophoretic devices; and after said third image writing step, a third reset step of completely erasing said third image by applying a third reset voltage to said plurality of electrophoretic devices, said third reset voltage being of a greater magnitude than said first and second reset voltages such that no afterimages of said first, second, and third images remain.

5. The electrophoretic apparatus according to claim 4, further comprising an input unit for inputting a command indicating that erasing the afterimages is necessary, wherein when the command indicating that erasing the afterimages is necessary is input, the control unit performs the third reset.

* * * * *